United States Patent
Crasta et al.

(10) Patent No.: US 10,223,265 B2
(45) Date of Patent: Mar. 5, 2019

(54) OPERATING LOCAL CACHES FOR A SHARED STORAGE DEVICE

(71) Applicant: International Business Machines Corporation, Armonk, NY (US)

(72) Inventors: Alol Antony Crasta, Bangalore (IN); Harshal S. Patil, Bangalore (IN); Kishorekumar G. Pillai, Bangalore (IN); Christoph Raisch, Boeblingen (DE); Nishant Ranjan, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 243 days.

(21) Appl. No.: 15/178,826

(22) Filed: Jun. 10, 2016

(65) Prior Publication Data

US 2017/0206162 A1 Jul. 20, 2017

Related U.S. Application Data

(63) Continuation of application No. 15/001,274, filed on Jan. 20, 2016.

(51) Int. Cl.
*H04L 29/06* (2006.01)
*H04L 29/08* (2006.01)
*G06F 12/0813* (2016.01)

(52) U.S. Cl.
CPC ...... *G06F 12/0813* (2013.01); *H04L 65/4076* (2013.01); *H04L 67/1095* (2013.01); *H04L 67/1097* (2013.01); *H04L 67/2842* (2013.01); *G06F 2212/154* (2013.01); *G06F 2212/222* (2013.01); *G06F 2212/263* (2013.01)

(58) Field of Classification Search
CPC ........... G06F 12/0813; G06F 2212/154; G06F 2212/222; G06F 2212/263; H04L 65/4076; H04L 67/1095; H04L 67/1097; H04L 67/2842
USPC ....................................................... 709/226
See application file for complete search history.

(56) References Cited

PUBLICATIONS

Alol Antony Crasta et al., Pending U.S. Appl. No. 15/001,274 entitled "Operating Local Caches for a Shared Storage Device," filed with the U.S. Patent and Trademark Office on Jan. 20, 2016.
List of IBM Patents or Patent Applictions Treated As Related; (Appendix P), Filed Jun. 10, 2016, 2 pages.

*Primary Examiner* — Nicholas R Taylor
*Assistant Examiner* — Chong G Kim
(74) *Attorney, Agent, or Firm* — Cantor Colburn LLP; Steven Chiu (57) ABSTRACT

Aspects include creating a network multicast group in a storage area network (SAN) for a first computer system and a second computer system that are connected by the SAN and that each include a local cache for a shared storage device. Prior to one of the first or second computer system writing write data to the shared storage device: the write data is written to the local cache of the one of the first or second computer system; the write data is sent to the multicast group; based on the send operation completing, the write data is written to the shared storage device; and based on the write operation completing, the write completion is signaled to an operating system or hypervisor of the first and second computer systems.

9 Claims, 5 Drawing Sheets

OPERATING LOCAL CACHES FOR A SHARED STORAGE DEVICE

DOMESTIC PRIORITY

This application is a continuation of U.S. patent application Ser. No. 15/001,274, filed Jan. 20, 2016, the content of which is incorporated by reference herein in its entirety.

BACKGROUND

The present invention relates generally to data processing systems, and more specifically, to operating local caches for a shared storage device in a storage area network (SAN).

Compared with traditional hard disks, flash/solid state devices (SSD) have superior input/output (I/O) performance. In addition, the cost of SSD devices has been continuously decreasing. These two factors make it increasingly popular to use SSD devices as a so called "second-level" cache which resides between the main memory (e.g., random access memory or RAM) and a primary persistent storage such as a hard disk (as opposed to so called "first-level" or buffer cache which needs to utilize a portion of the main memory). Such a "second level" cache can be used by an operating system (OS) to cache "hot" I/O blocks (e.g., I/O blocks that may be frequently accessed) to improve I/O latency and throughput. Typically, such second-level caching involves a filter driver in the OS kernel I/O stack, which can intercept all I/Os, identify hot blocks, and dispatch I/Os to a cache or persistent storage.

In a virtualized environment, however, using a SSD device as a second-level cache brings up new challenges. For example, because a host computer system (e.g., a "host") supports the running of multiple virtual machines (VMs) in a virtualization environment, the host computer system would need to manage the second-level cache on a per-VM basis and maintain VM-specific caching policies. In addition, VM live migration, also referred to as "VMotion", is a technology that enables moving running VMs between different hosts without service interruption, and with complete transaction integrity. During VMotion, the hypervisor moves a VM's memory to the new host over a network connection (such as Ethernet) first, and then quickly suspends the VM on the original host and resumes it on the new host. It is often critical to keep the migration latency low in order to guarantee continuous service availability for VMotion.

SUMMARY

According to embodiments, a method, system, and computer program product for operating local caches for a shared storage device. A method includes creating a network multicast group in a storage area network (SAN) for a first computer system and a second computer system that are connected by the SAN. The first and second computer systems, each including a local cache for a shared storage device. Prior to one of the first or second computer system writing write data to the shared storage device: writing the write data to the local cache of the one of the first or second computer system; sending the write data to the multicast group; based on the send operation completing, writing the write data to the shared storage device; and based on the write operation completing, signaling write completion to an operating system or hypervisor of the first and second computer systems. Based on one of the first or second computer system requesting a read of read data from the shared storage device: waiting for parallel write operations to complete for the read data in the multicast group; retrieving the read data from the local cache of the one of the first or second computer system based on the read data being available in the local cache of the one of the first or second computer system; and retrieving the read data from the shared storage device and storing the read data in the local cache of the one of the first or second computer system based on the read data not being available in the local cache of the one of the first or second computer system.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, in which:

DETAILED DESCRIPTION

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

When a host uses a solid state device (SSD) as a second-level cache, how to take advantage of the SSD cache during VMotion can present a challenge. A method is proposed for operating on a first computer system and a second computer system (each having a local cache each for a shared storage device) in a storage area network (SAN). The first computer system and the second computer system are connected by a network. The method can include: creating a network multicast group in the network for the first computer system and the second computer system by a reliable multicast mechanism; before one of the computer systems writes data to the storage device, writing this data to its local cache, sending this data to the multicast group and when the send operation is completed, writing this data to the storage device, and when the write operation is completed, signaling write completion to an operating system (OS)/hypervisor of the computer systems; and when one of the computer systems reads data from the storage device waiting for parallel write operations to complete for this data in the multicast group, and then retrieving this data from its local cache in case the data is available, otherwise retrieving this data from the storage device and storing it to its local cache.

In embodiments, each computer system has one or multiple operating systems sharing data on a single shared storage device in a SAN which can be addressed by a worldwide unique number, as a worldwide node name (WWNN) and/or a logical unit number (LUN). Sharing of the storage device may be an active/passive sharing or an active/active sharing. Sharing can be accomplished by a cache management component which may utilize e.g. a SSD as a local fast read/write cache. A reliable multicast mechanism is used for distributing written data through a network adapter with one multicast group per logical storage device. A network adapter is used to load/store data from a remote location via a block storage controller.

According to an embodiment of the invention, a method and a system is proposed to maintain a server side input/output (I/O) cache coherency in a server cluster having a shared storage device in a SAN using a reliable multicast mechanism. If the cluster of servers are interested in the same storage LUN, then multicasting all writes to a group where all interested servers are members, thus maintaining I/O cache coherency throughout the cluster.

Thus a straight forward cache coherency management can be achieved, as it does not require a special purpose mechanism in the hypervisor host. Neither does it require a special purpose dedicated network nor a hierarchical or owner/master type of control for the LUN cache maintenance. A single write I/O updates the local cache on all participant servers irrespective of the member count. Embodiments of methods described herein are achieved solely via inband SAN path to have cache coherency. Joining and leaving the multicast group is transparent to other members, as there is no master for the LUN cache.

Embodiments also include an apparatus for executing method described herein, where the SAN includes fibre channel switches.

Embodiments also include a computer program product for operating on a first computer system and a second computer system a local cache each for a shared storage device in a storage area network. The first computer system and the second computer system are connected by a network. The computer program product can include a computer readable storage medium having program instructions embodied therewith, the program instructions executable by a computer to cause the computer to perform a method. The method can include creating a network multicast group in the network for the first computer system and the second computer system by a reliable multicast mechanism; before one of the computer systems writes data to the storage device, writing this data to its local cache, sending this data to the multicast group and when the send operation is completed, writing this data to the storage device, and when the write operation is completed, signaling write completion to an operating system (OS)/hypervisor of the computer systems; and when one of the computer systems reads data from the storage device waiting for parallel write operations to complete for this data in the multicast group, and then retrieving this data from its local cache in case the data is available, otherwise retrieving this data from the storage device and storing it to its local cache.

Embodiments can also include a data processing system for execution of a data processing program that includes computer readable program instructions for performing the methods described herein.

The illustrative embodiments described in FIGS. 1 to 5 provide a method, system, and computer program product for operating on a first computer system 10 and a second computer system 30 (each include a local cache 16, 36 for a shared storage device 52, 54 in a SAN 50), where the first computer system 10 and the second computer system 30 are connected by the SAN 50. The illustrative embodiments are sometimes described herein using particular technologies only as an example for the clarity of the description. The illustrative embodiments may be used for performing a method that includes: creating a network multicast group 62, 64 in the network 60 for the first computer system 10 and the second computer system 30 by a reliable multicast mechanism; before one of the computer systems 10, 30 writes data to the storage device 52, 54, writing this data to its local cache 16, 36, sending this data to the multicast group 62, 64 and when the send operation is completed, writing this data to the storage device 52, 54, and when the write operation is completed, signaling write completion to an OS/hypervisor 12, 32 of the computer systems 10, 30; when one of the computer systems 10, 30 reads data from the storage device 52, 54, (a) waiting for parallel write operations to complete for this data in the multicast group 62, 64, and (b) retrieving this data from its local cache 16, 36 in case the data is available, otherwise retrieving this data from the storage device 52, 54 and storing it to its local cache 16, 36.

Figure 1:
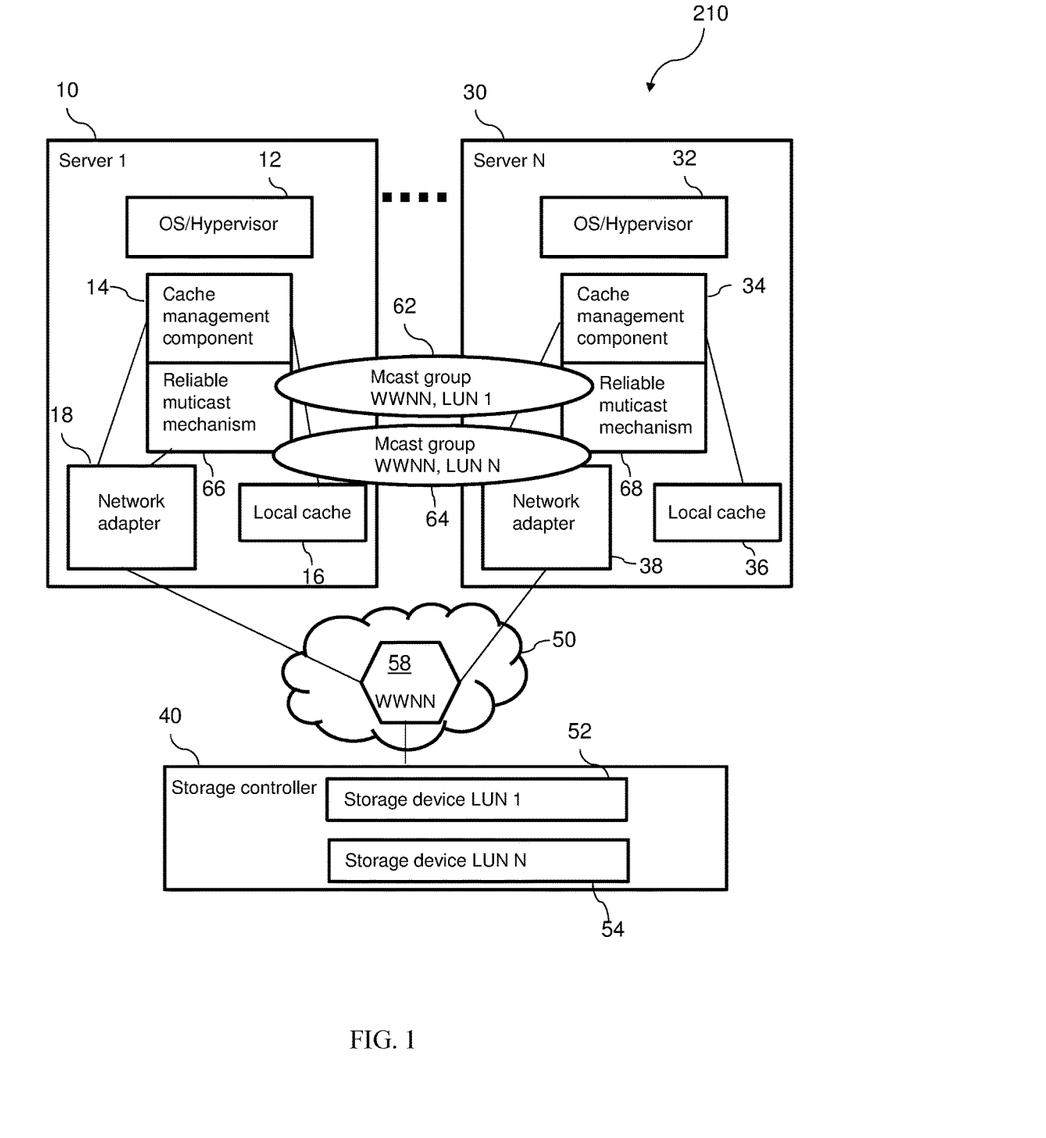
FIG. 1 is a block diagram of a data processing system for executing the method according to an embodiment of the invention.

FIG. 1 depicts a block diagram of a data processing system 210 for executing a method according to an embodiment of the invention.

FIG. 1 shows an embodiment of a setup for I/O cache management using reliable multicast. According to an embodiment, the overall I/O cache state is kept consistent on various failing messages or components in a server cluster. The embodiment includes a cluster of physical or virtual servers, exemplified as the first computer system 10 or server 1, and the second computer system 30 or server N, connected to the shared SAN 50 storage via one or more storage controllers 40. The SAN 50 comprises at least one storage controller 40 for access to the storage device 52, 54. The storage controller shared logical storage devices 52, 54 with a logical unit number (LUN) are named LUN 1, LUN N in FIG. 1. Each storage device 52, 54 is uniquely identified by each computer system 10, 30 using a 64 bit identifier, which is referred as the LUN identifier. The embodiment may be realized as fibre channel protocol (FCP) SAN as the transport technology with a fibre channel switch 58, however embodiments can use other transport mechanisms such as Ethernet and Internet protocol (IP) SAN. The sharing of these logical storage devices 52, 54 (LUNs) can be based on any of the supported LUN serving modes—symmetric or asymmetric, active-active or active-standby or active-passive. Each of these computer systems 10, 30 houses one or more OSs or hypervisor layers 12, 32, the local cache 16, 36, realized as a SSD and the storage network adapter 18, 38, like e.g. a host bus adapter (HBA). SSDs can be used as fast local cache storage for I/O. In an embodiment, it is through the HBA that the I/O gets shipped to/from the SAN storage devices 52, 54.

In the embodiment shown in FIG. 1, the cache management component (CM) 14, 34 manages the fast I/O cache of the server 10, 30 using the local cache 16, 36. The creation of a multicast group 62, 64 for attaining cache coherency is done via the cache management module 14, 34. One multicast group 62, 64 for each storage device 52, 54 is created and identified using a unique identifier of the storage controller 40 and the storage device 52, 54. For instance, the storage controller worldwide node identifier (WWNN) and LUN 1, LUN N may be used as a pair to identify the multicast group 62, 64 for a given storage device 52, 54.

As shown in FIG. 1, two multicast groups 62, 64 are created, for the corresponding storage devices 52, 54 with the storage controller identifier WWNN. So two multicast groups 62, 64 for each storage device 52, 54 with corresponding identifiers WWNN,LUN 1 and WWNN,LUN N, respectively, are created.

Read and write caching is supported by embodiments. When workloads in the computer systems 10, 30 request for reads from a storage device 52, 54, the cache components behavior can be implemented using contemporary methods. In embodiments, on any write request from applications (workloads) to each storage device 52, 54, the cache components work with the reliable multicast mechanism which ships I/O frames to the multicast group 62, 64 for that storage device 52, 54. Each recipient of the multicast transfer updates its I/O cache, if the cache line is of interest. The cache management component 14, 34 ensures that the write operation to the storage device 52, 54 is completed and marks the local cache contents as "sent", while guaranteeing the acknowledgement of the write operation to the guest OS. Thus written data are distributed through the network adapter 18, 38 with at least one multicast group 62, 64 per storage device 52, 54.

This way the I/O cache is updated to all the members in each write operation. This way each of the participating servers 10, 30 in the multicasting group 62, 64 will get the cache contents updated in parallel, for each write operation. Thus, embodiments alleviate achieving cache coherency, as well as the need to have an owner for each storage device 52, 54 to update the cache content.

The cache management component 14, 34 exploits the performance and accuracies in the reliable multicast mechanism (RMM) 66, 68. Embodiments take advantage of the RMM's 66, 68 high performance unique method of message-to-packet mapping which enables delay-free, high-speed data delivery of hundreds of thousands (up to a few millions) messages per second, at sub-millisecond latencies. Embodiments of this method works with both multicast and unicast transport.

The cache management component 14, 34 and the RMM 66, 68 are installable software/firmware/microcode components that can coexist independently as a kernel/core component in each of the hypervisors 12, 32 in the computer systems 10, 30.

The cache management component 14, 34 of each of the first and second computer systems 10, 30 is able to create/close the multicast group 62, 64 and/or write/read data to the local cache 16, 36 and/or the storage device 52, 54.

Figure 2:
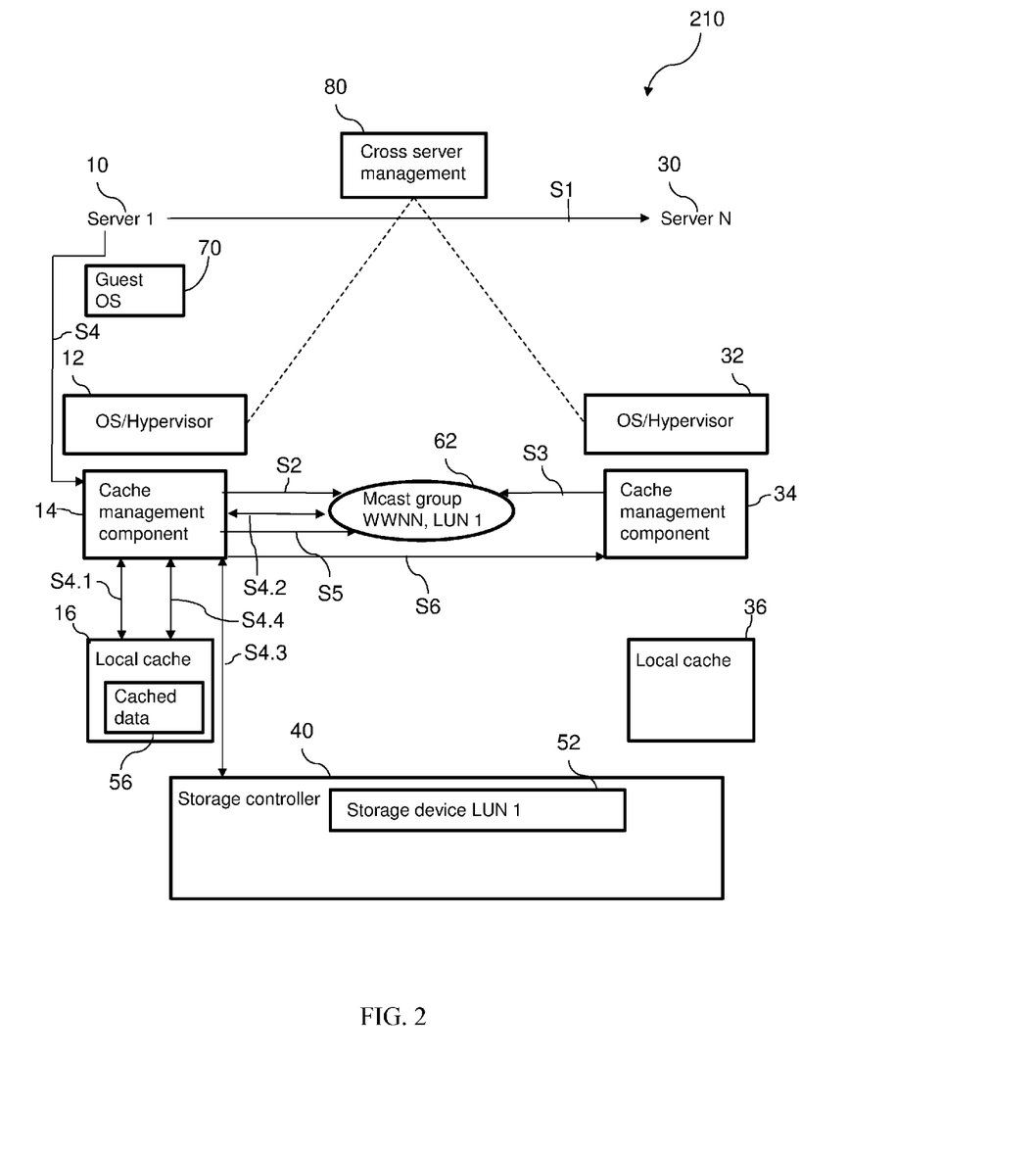
FIG. 2 is a first stage data flow for migrating a guest from a first computer system to a second computer system according to an embodiment of the invention.
Figure 3:
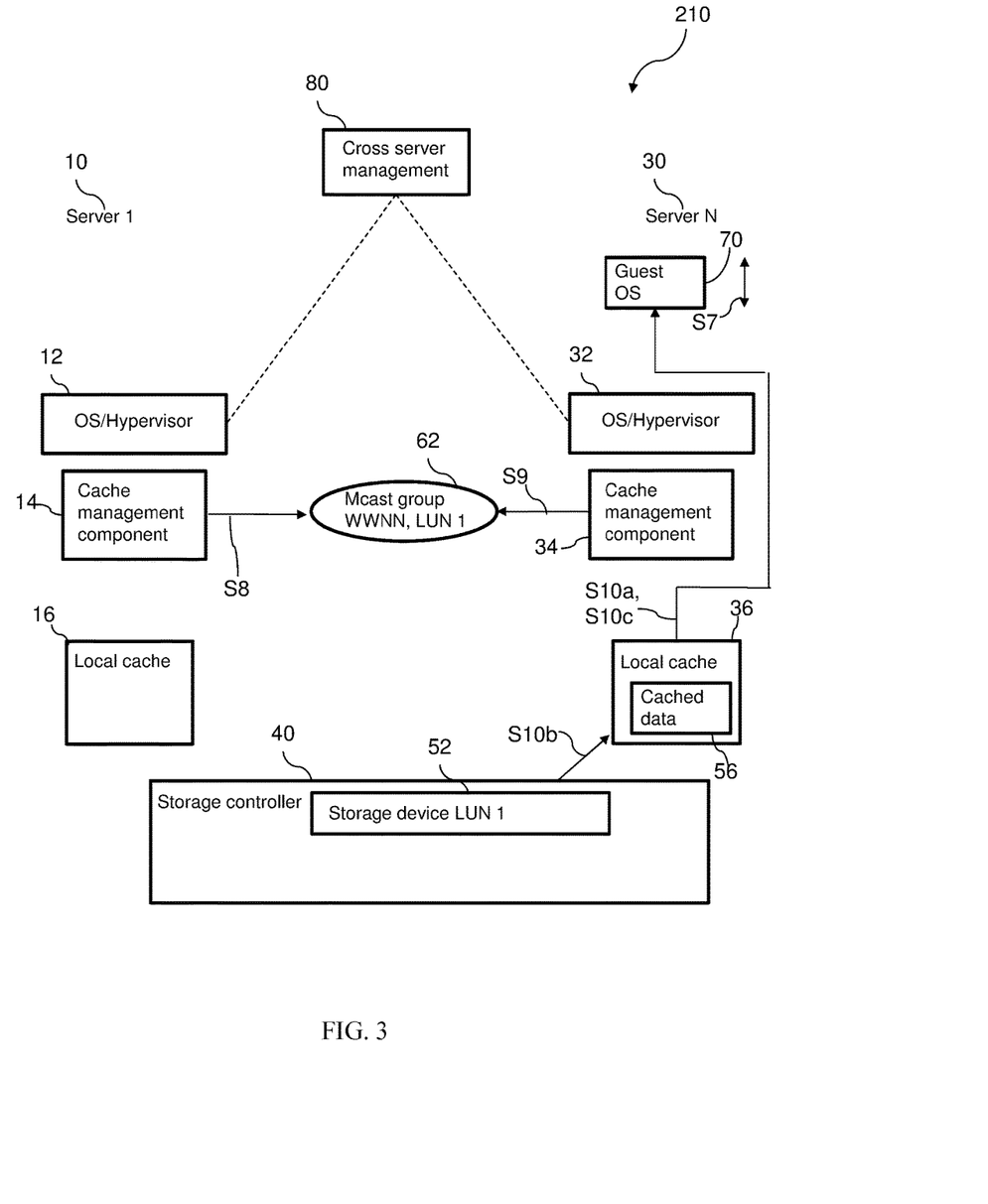
FIG. 3 is a second stage data flow for migrating a guest from a first computer system to a second computer system according to an embodiment of the invention.

In FIG. 2 a first stage data flow for migrating a guest 70 from a first computer system 10 to a second computer system 30 according to an embodiment of the invention is shown, whereas in FIG. 3 a second stage data flow for migrating the guest 70 from the first computer system 10 to the second computer system 30 according to an embodiment of the invention is depicted.

In an embodiment, the guest 70 is migrated from the first computer system 10 to the second computer system 30 by: creating the network multicast group 62, 64 on the first computer system 10; the second computer system 30 joining the multicast group 62, 65; the first computer system 10 writing data from the guest 70 to the storage device 52, 54; sending all data not being sent to the storage device 52, 54 to the multicast group 62, 64 and waiting for completion; and stopping execution of the guest 70 on the first computer system 10, 30 upon completion of writing data.

In order to illustrate a live guest migration as an example, the flow can be expressed in two stages based on the actions that occur in the first computer system 10, where migration is made viable and the interaction with the second computer system 30 to ensure the guest 70 as a virtual machine is moved successfully and running in the second computer system 30.

The cross server management function 80 initiates the migration of the guest OS from the first computer system 10 to the second computer system 30 in step S1. This cross server management function 80 is a part of any virtualization management application which has the visibility to manage, monitor and control the virtualization aspects of the system.

In step S2 the cache management component 14 on the first computer system 10 creates the multicast group 62 for the storage device 52 using the WWNN of the storage controller 40 the storage device 52 is housed and the LUN number itself as the pair to uniquely distinguish the multicast group 62, i.e. WWNN, LUN 1. This implies that the first computer system 10 using its storage network adapter 18 is now the first member of the multicast group 62.

Next in step S3 the cache management component 34 on the second computer system 30 intends to be the recipient of the guest 70 migrated and therefore joins the multicast group 62 {WWNN, LUN 1}.

Then in step S4 the guest OS writes to the storage device 52 as part of its normal data path operations, initializing the writing operation via the cache management component 14. Any writes to the storage device 52 will be stored and made available in one or more cache lines in the local cache 16 in step S4.1. The cache management component 14 sends, in step S4.2, the I/O to the multicast group 62 {WWNN, LUN1} using the respective storage network adapters 18, 38 and waits for completion, using the reliable multicast messaging technique. The cache management component 14 writes/flushes the cache line to the block storage controller 40 in step S4.3 via storage network adapter 18 and waits for completion. Next in step S4.4 the cache management component 14 marks the cache lines as "sent" in the local cache 16.

The cache management component 14 continues to send all the data which are not marked as "sent" for the storage device 52 to the multicast group 62 {WWNN, LUN 1} in step S5. It waits for the completion and after completion marks all the cache lines, the cached data 56, as "sent" in the local cache 16. This ensures that all the cache contents intent for the storage device 52 will be made coherent with the local cache 36 of the second computer system 30.

Then the first computer system 10 signals the completion of stage one to the second computer system 30 in step S6. The guest OS quiesces its operation and stops execution on the first computer system 10.

Next, referring to FIG. 3, the second computer system 30 continues the execution of the migrated guest 70, i.e. the guest OS, marked by step S7.

After migrating the guest 40 from the first computer system 10 to the second computer system 30, an embodiment of the method includes: continuing execution of the guest 70 on the second computer system 30; the first computer system 10 disconnecting and closing the multicast group 62, 64; the second computer system 30 disconnecting and closing the multicast group 62, 64; if reading data from the guest 70, checking if this data is available in its local cache 36, in case the data is available, returning data to the guest 70, otherwise retrieving this data from the storage device 52, 54 and storing it to its local cache 36 and returning data to the guest 70.

Thus as a first step S8, the first computer system 10 disconnects and closes the multicast group 62 for the storage device 52, {WWNN, LUN 1}.

The second computer system 30 disconnects too and closes the multicast group 62 for the storage device 52 in step S9. Unless the last member disconnects, the multicast group 62 still exits. So in an alternate implementation, it is possible that the two previous steps may be replaced with the first computer system 10 leaving the multicast group 62 and the second computer system 30 taking the ownership of the multicast group 62 for the storage device 52.

Next in steps S10a and S10b the guest OS on the second computer system 30 continues the I/O path with normal read and write operation to the storage device 52. The cache management component 34 checks for existence of cached data 56 in the local cache 36, and returns the data 56 to the guest OS in step S10a. On a cache miss, in step S10b the cache management component 34 updates the local cache 36 by fetching the data 56 from the storage controller 40 for the storage device 52. Then the cache management component 34 returns the data 56 to the guest OS with step S10c.

Figure 4:
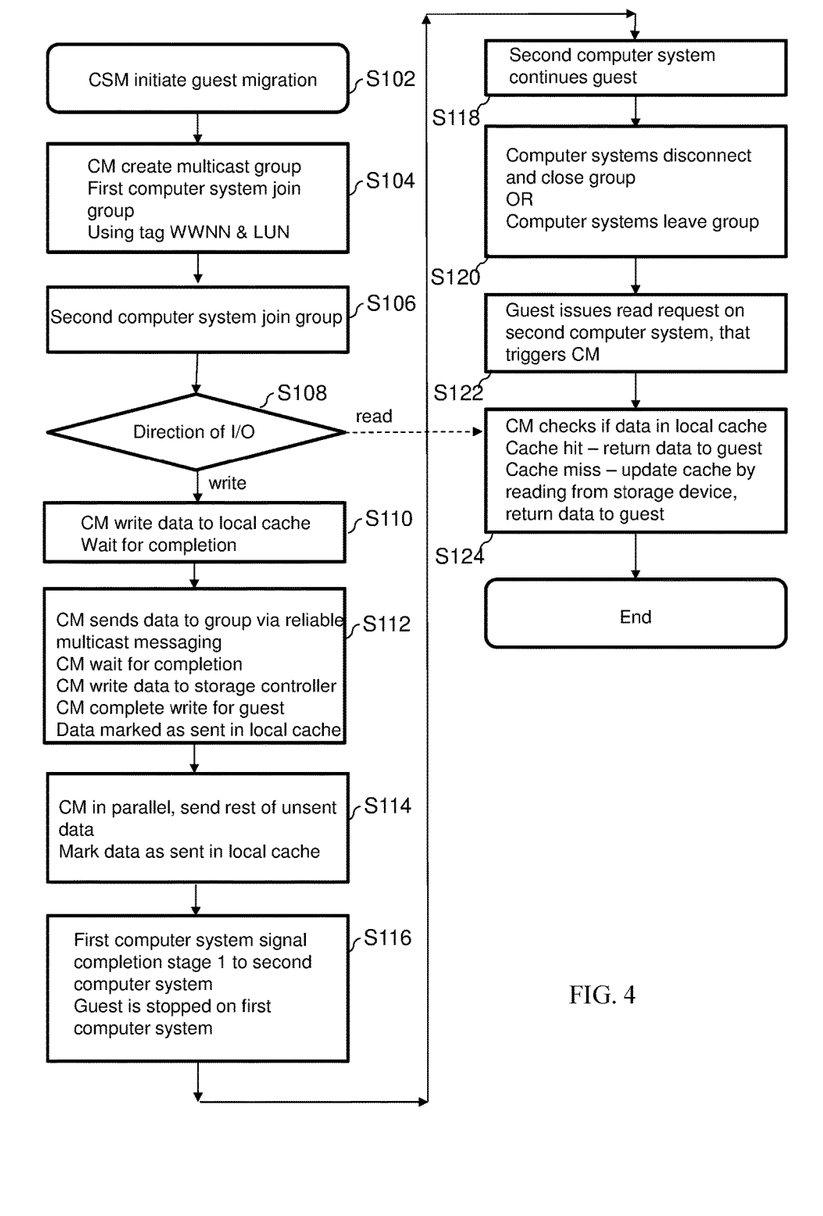
FIG. 4 is a flowchart for migrating a guest from a first computer system to a second computer system according to an embodiment of the invention.

FIG. 4 shows a flowchart for migrating the guest 70 from the first computer system 10 to a second computer system 30 according to an embodiment of the invention. Reference numerals of components refer to the components shown in the previous FIGS. 1 to 3.

In step S102 the cross server management 80 initiates the guest migration from the first computer system 10 to the second computer system 30. Next in step S104 the cache management component 14 creates the multicast group 62 for the specific storage device 52 in order to achieve cache coherency at the first computer system 10 and for the first computer system 10 join the multicast group 62. A tag derived out of the WWNN of the storage controller 40 and the LUN number itself. In step S106 the cache management component 34 on the second computer system 30 joins the multicast group 62. In step S108 the direction of the I/O operation is checked.

If it is a write operation, next, in step S110, the cache management component 14 writes data to the local cache 16 and then waits for completion of the operation. After completion the cache management component 14 in step S112 sends data to the multicast group 62 using the reliable multicast messaging mechanism (RMM) and waits for completion. Then the cache management component 14 writes data to the storage controller 40 thus updating the contents of the storage device 52. The cache management component 14 completes the write operation for the guest 70 with acknowledgement and the data is marked as "Sent" in the local cache 16. Then, in step S114, the cache management component 14 in parallel, sends the rest of the data that are not "sent" to the multicast group 62 and marks them as "sent". In step S116 the first computer system 10 signals the second computer system 30 completion for "stage1" and the guest OS operation in the first computer system 10 is quiesced. Next in step S118 the second computer system 30 continues execution of the guest OS. In step S120 the first and the second computer system 10, 30 disconnect and close the multicast group 62. Alternatively the first and the second computer system 10, 30 may leave the multicast group 62. Then in step S122 a read request from the guest OS on the second computer system 30 triggers the cache management component 34. The cache management component 34 then in step S124 checks if data is in the local cache 36. If there is a cache hit, data are returned to the guest OS. If there is a cache miss, the local cache 36 is updated by reading from the storage controller 40 the storage device 52 and the data are returned to the guest OS. Then the process is stopped.

If the checking operation in step S108 delivers a read operation, the flow continues in step S124 with the cache management component 34 checking if there is data in the local cache 36, continuing as described above.

Figure 5:
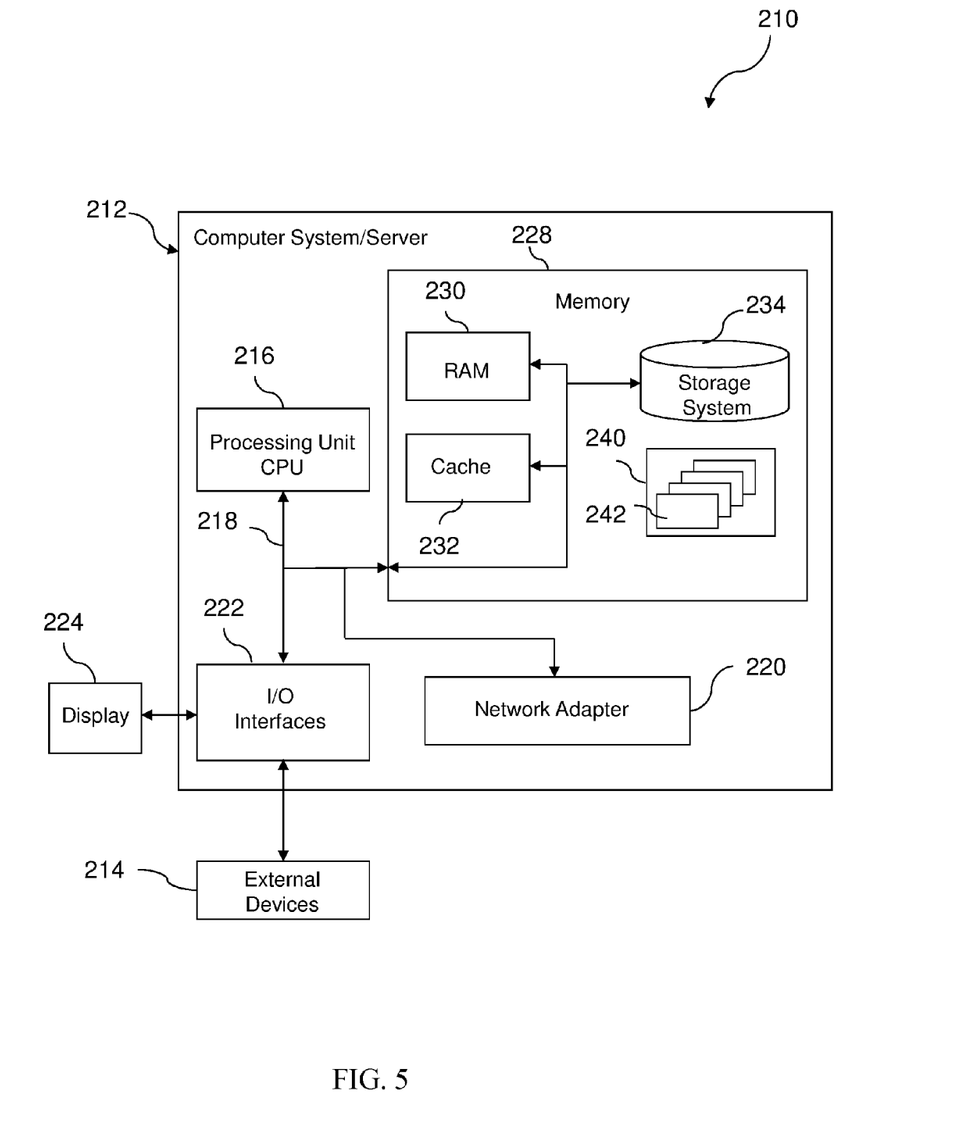
FIG. 5 is an example embodiment of a data processing system for executing a method according to an embodiment the invention.

Referring now to FIG. 5, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an Operating System, one or more application programs, other program modules, and program data. Each of the Operating System, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via I/O interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

Embodiments described herein include a method for operating on a first computer system (10) and a second computer system (30) a local cache (16, 36) each for a shared storage device (52, 54) in a storage area network (50), wherein the first computer system (10) and the second computer system (30) are connected by the storage area network (50), comprising: creating a network multicast group (62, 64) in the storage area network (50) for the first computer system (10) and the second computer system (30) by a reliable multicast mechanism; before one of the computer systems (10, 30) writes data to the storage device (52, 54), writing this data to its local cache (16, 36), sending this data to the multicast group (62, 64) and when the send operation is completed, writing this data to the storage device (52, 54), and when the write operation is completed, signaling write completion to an OS/hypervisor (12, 32) of the computer systems (10, 30); when one of the computer systems (10, 30) reads data from the storage device (52, 54), waiting for parallel write operations to complete for this data in the multicast group (62, 64), and then retrieving this data from its local cache (16, 36) in case the data is available, otherwise retrieving this data from the storage device (52, 54) and storing it to its local cache (16, 36).

The above method can also include a cache management component (12, 32) of each of the first and second computer systems (10, 30) creating/closing the multicast group (62, 64) and/or writing/reading data to the local cache (16, 36) and/or the storage device (52, 54).

One or more of the above methods can also include the multicast group (16, 36) being attributed to the storage device (52, 54).

One or more of the above methods can also include the storage area network (50) comprising at least one storage controller (40) for access to the storage device (52, 54).

One or more of the above methods can also include distributing written data through the network adapter (18, 38) with at least one multicast group (62, 64) per storage device (52, 54).

One or more of the above methods can also include that the multicast group is identified by a world-wide unique identifier of the corresponding network adapter (56) and/or a unique identifier of the storage device (52, 54).

One or more of the above methods can also include that a guest (70) is migrated from the first computer system (10) to the second computer system (30), the migrating including: creating the network multicast group (62, 64) on the first computer system (10); the second computer system (30) joining the multicast group (62, 65); the first computer system (10) writing data from the guest (70) to the storage device (52, 54); sending all data not being sent to the storage device (52, 54) to the multicast group (62, 64) and waiting for completion; and stopping execution of the guest (70) on the first computer system (10, 30) upon completion of writing data.

One or more of the above methods can also include, after migrating the guest (40) from the first computer system (10) to the second computer system (30): continuing execution of the guest (70) on the second computer system (30); the first computer system (10) disconnecting and closing the multicast group (62, 64); the second computer system (30) disconnecting and closing the multicast group (62, 64); and if reading data from the guest (70), checking if this data is available in its local cache (36), in case the data is available, returning data to the guest (70), otherwise retrieving this data from the storage device (52, 54) and storing it to its local cache (36) and returning data to the guest (70).

One or more of the above methods can also include, after migrating the guest (70) from the first computer system (10) to the second computer system (30): continuing execution of the guest (70) on the second computer system (30); the first computer system (10) leaving the multicast group (62, 64); the second computer system (30) taking ownership of the multicast group (62, 64); and if reading data from the guest (70), checking if this data is available in its local cache (36), in case the data is available, returning data to the guest (70), otherwise retrieving this data from the storage device (52, 54) and storing it to its local cache (36) and returning data to the guest (70).

Embodiments can also include an apparatus for performing one or more of the above methods, wherein the storage area network (50) includes fibre channel switches (58).

The apparatus can also include the network adapter (56) comprising host bus adapters for access of the first and second computer systems (10, 30) and/or the storage device (52, 54). One or more of the apparatuses can also include, the first computer system (10, 30) comprising a physical server or a virtual server. One or more of the apparatuses can also include the local cache (16, 36) comprising a solid state device.

Embodiments can also include a computer program product for operating on a first computer system (10) and a second computer system (30) a local cache (16, 36) each for a shared storage device (52, 54) in a storage area network (50), wherein the first computer system (10) and the second computer system (30) are connected by the storage area network (50), the computer program product comprising a computer readable storage medium having program instructions embodied therewith, the program instructions executable by a computer (212) to cause the computer (212) to perform one or more of the above methods.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, Firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method comprising:
    creating a network multicast group in a storage area network (SAN) for a plurality of computer systems that are connected by the SAN, the plurality of computer systems comprising at least three computer systems including a first computer system and a second computer system, the plurality of computer systems each comprising a local cache for a shared storage device;
    prior to one of the first or second computer system writing write data to the shared storage device:
        writing the write data to the local cache of the one of the first or second computer system;
        sending the write data to the plurality of computer systems in the multicast group;
        based on the send operation completing, writing the write data to the shared storage device; and
        based on the write operation completing, signaling write completion to an operating system or hypervisor of the first and second computer systems; and
    based on one of the first or second computer system requesting a read of read data from the shared storage device:
        waiting for parallel write operations to complete for the read data in the plurality of computer systems in the multicast group;
        retrieving the read data from the local cache of the one of the first or second computer system based on the read data being available in the local cache of the one of the first or second computer system; and
        retrieving the read data from the shared storage device and storing the read data in the local cache of the one of the first or second computer system based on the read data not being available in the local cache of the one of the first or second computer system.

2. The method according to claim 1, wherein a cache management component of each of the first and second computer systems performs the creating, writing and retrieving from the local cache and the shared storage device.

3. The method according to claim 1, wherein the multicast group is attributed to the storage device.

4. The method according to claim 1, wherein the SAN comprises at least one storage controller for access to the shared storage device.

5. The method according to claim 4, further comprising distributing the write data through the network adapter with at least one multicast group per storage device.

6. The method according to claim 1, wherein the multicast group is identified by at least one of a world-wide unique identifier of the corresponding network adapter and a unique identifier of the storage device.

7. The method according to claim 1, wherein a guest is migrated from the first computer system to the second computer system, the migrating comprising
    creating the network multicast group on the first computer system;
    joining, by the second computer system, the multicast group;
    writing, by the first computer system, data from the guest to the storage device;
    sending all data not being sent to the shared storage device to the multicast group and waiting for completion;
    stopping execution of the guest on the first computer system upon completion of the writing.

8. The method according to claim 7, further comprising, subsequent to the migrating:
    continuing execution of the guest on the second computer system;
    disconnecting the first computer system and closing the multicast group for the first computer system;
    disconnecting the second computer system and closing the multicast group for the second computer system;
    based on reading data from the guest, checking whether the data being read is available in a local cache of the guest;
    based on the data being available in the local cache of the guest, returning the data to the guest; and
    based on the data not being available in the local cache of the guest, storing the data in the local cache of the guest and returning the data to the guest.

9. The method according to claim 7, further comprising, subsequent to the migrating:
    continuing execution of the guest on the second computer system;
    leaving, by the first computer system, the multicast group;
    taking ownership, by the second computer system, the multicast group;
    based on reading data from the guest, checking to see if the data is available in a local cache of the guest;
    based on the data being available in the local cache of the guest, returning the data to the guest; and
    based on the data not being available in the local cache of the guest, retrieving the data from the shared storage device and returning the data to the guest.

* * * * *